United States Patent
Kudoh

(10) Patent No.: US 7,548,382 B2
(45) Date of Patent: Jun. 16, 2009

(54) LENS BARREL AND IMAGING DEVICE

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/015,228

(22) Filed: Jan. 16, 2008

(65) Prior Publication Data

US 2008/0204895 A1 Aug. 28, 2008

(30) Foreign Application Priority Data

Jan. 18, 2007 (JP) ............... 2007-009302

(51) Int. Cl.
*G02B 15/14* (2006.01)
(52) U.S. Cl. .................. 359/700; 359/699
(58) Field of Classification Search .......... 359/694–703
See application file for complete search history.

(56) References Cited

U.S. PATENT DOCUMENTS

| 6,813,093 B2 * | 11/2004 | Takagi et al. ........... 359/700 |
| 6,937,817 B2 | 8/2005 | Yasuda ................. 396/84 |
| 7,116,901 B2 | 10/2006 | Sakamoto ............... 396/84 |
| 7,372,638 B2 * | 5/2008 | Yoshii et al. ........... 359/699 |
| 2004/0165876 A1 | 8/2004 | Yasuda |
| 2005/0254814 A1 | 11/2005 | Sakamoto |

FOREIGN PATENT DOCUMENTS

| JP | 2002-182097 A | 6/2002 |
| JP | 2004-258167 A | 9/2004 |
| JP | 2004-258195 A | 9/2004 |
| JP | 2005-326629 A | 11/2005 |

* cited by examiner

*Primary Examiner*—Mohammed Hasan
(74) *Attorney, Agent, or Firm*—Rossi, Kimms & McDowell LLP

(57) ABSTRACT

A lens barrel which allows efficient interlock between a cylindrical member such as a moving cam ring and a component such as a viewfinder cam plate or a strobe cam plate, without size-increasing. The lens barrel comprises a first cylindrical member, and a second cylindrical member that is disposed so as to receive the first cylindrical member, and includes a guiding part at an inner circumferential surface thereof. The guiding part includes a groove-form hole part that penetrates the second cylindrical member, and the first cylindrical member includes a follower part that follows the guiding part having the groove-form hole part.

14 Claims, 7 Drawing Sheets

LENS BARREL AND IMAGING DEVICE

BACKGROUND OF THE INVENTION

1. Field of the Invention

The present invention relates to a lens barrel having an imaging lens, and an imaging device such as a camera or the like with the lens barrel provided therein.

2. Description of the Related Art

Many of the digital cameras which have been widely adopted in recent years include a viewfinder to allow a user to determine an angle of view of a subject. Many of these digital cameras also include a strobe mechanism to illuminate of the subject with visible light when the subject is in darkness.

Such digital cameras also generally include a zoom mechanism, and therefore require an accompanying viewfinder zoom. In cameras including a zoom mechanism, a zoom-strobe mechanism which changes the angle of view in a strobe device in conjunction with the zoom magnification of the barrel lens is generally known. An example of a camera including such a viewfinder is disclosed in Japanese Laid-Open Patent Publication (Kokai) No. 2004-258167. Further, an example of a camera including a zoom-strobe mechanism is disclosed in Japanese Laid-Open Patent Publication (Kokai) No. 2002-182097.

In the technology of Japanese Laid-Open Patent Publication (Kokai) No. 2004-258167, a viewfinder cam plate is provided to rotate as a moving cam ring in the zoom barrel rotates, and a viewfinder zoom operation is performed by way of a viewfinder lens following a cam groove provided in the viewfinder cam plate. During this operation, the moving cam ring and the viewfinder cam plate are interlocked using a specially provided protruding member on the moving cam ring.

In the technology of Japanese Laid-Open Patent Publication (Kokai) No. 2002-182097, a strobe cam plate moves as the lens barrel rotates, causing the strobe to move back and forth along an optical axis direction.

However, in the technology of Japanese Laid-Open Patent Publication (Kokai) No. 2004-258167, not only must a member to allow the moving cam ring to interlock with the viewfinder cam plate be specially provided on the moving cam ring, but a groove for fitting the viewfinder cam plate in a fixed barrel must be located in a central region of the fixed barrel. The resulting construction constraints cause a problem in that the thickness of the barrel has to increase in the optical axis direction.

Similarly, in the technology of Japanese Laid-Open Patent Publication (Kokai) No. 2002-182097, not only must a member to allow the moving cam ring to interlock with the strobe cam plate be specially provided on the moving cam ring, but a groove for fitting the strobe cam plate in a fixed barrel must be located in a central region of the fixed barrel. The resulting construction constraints cause a problem in that the thickness of the barrel has to increase in the optical axis direction.

The present invention has been made to solve the above-described problems and hence provides a lens barrel and an imaging device which allow efficient interlock between a cylindrical member such as a moving cam ring and a component such as a viewfinder cam plate or a strobe cam plate, without size-increasing.

SUMMARY OF THE INVENTION

In a first aspect of the present invention, there is provided with a lens barrel comprising: a first cylindrical member; and a second cylindrical member that is disposed so as to receive the first cylindrical member, and includes a guiding part at an inner circumferential surface thereof, wherein the guiding part includes a groove-form hole part that penetrates the second cylindrical member, and the first cylindrical member includes a follower part that follows the guiding part having the groove-form hole part.

The first cylindrical member can be driven by a driving unit, and the guiding part can be adapted to movably guide the follower part in an optical axis direction of the lens barrel as the first cylindrical member is driven by the driving unit.

The lens barrel can comprise a groove-form hole follower part that is fitted in the groove-form hole part and follows the groove-form hole part.

The follower part can be adapted to drive the groove-form hole follower part via the groove-form hole part.

The guiding part can be adapted to include such a phase as that the groove-form hole follower part does not interlock with the follower part.

The first cylindrical member can include a groove-form hole follower driving part that drives the groove-form hole follower part via the groove-form hole part.

The guiding part can be adapted to include such a phase as that the groove-form hole follower part does not interlock with the groove-form hole follower driving unit.

The guiding part can comprise a cam groove, the groove-form hole part can comprise a through hole, and the follower part can comprise a follower pin.

The groove-form hole follower part can be provided with a viewfinder cam that drives a viewfinder lens.

The groove-form hole follower part can be provided with a strobe cam that drives at least one of a strobe lens and a strobe light generating unit.

The groove-form hole follower part can be provided with a viewfinder cam that drives a viewfinder lens and at least one of a strobe lens and a strobe light generating unit.

The lens barrel further can comprise a cylindrical member holding part that holds the second cylindrical member, wherein the second cylindrical member can be joined to the cylindrical member holding part at a position where the groove-form hole part is formed.

The groove-form hole follower part can include a rib-form protrusion, the second cylindrical member can include a socket part to accept the rib-form protrusion, and the groove-form hole follower part and the second cylindrical member can be integrated by the protrusion passing through the socket part.

In a second aspect of the present invention, there is provided with an imaging device including the above-mentioned lens barrel.

The present invention enables efficient interlock between a cylindrical member such as a moving cam ring and a component such as a viewfinder cam plate or a strobe cam plate, without size-increasing.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

<Construction of Imaging Device>

A construction of an imaging device, such as a digital camera, including a barrel lens according to an embodiment of the present invention is described below with reference to FIGS. 1A and 1B, and FIGS. 2A to 2C.

Figure 1A:
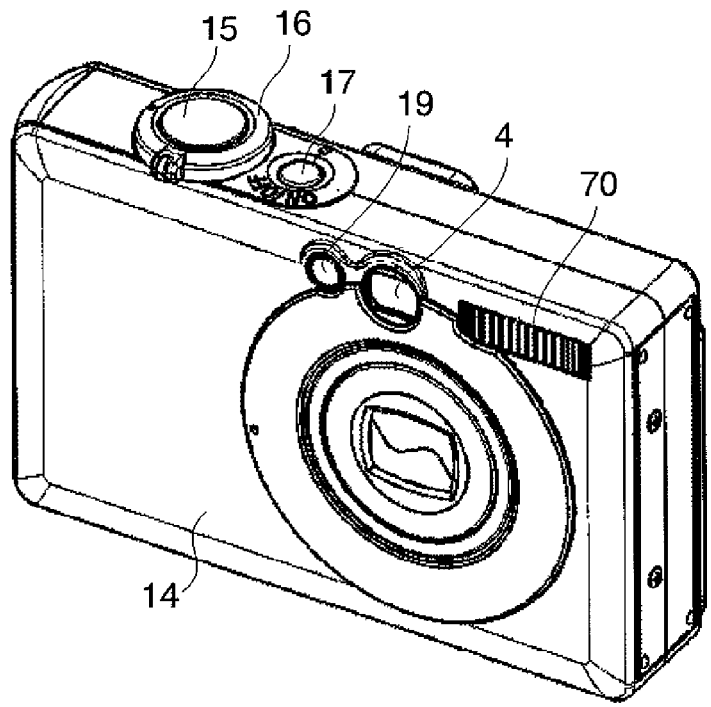
FIGS. 1A and 1B are external perspective views of a digital camera that is an imaging device including a barrel lens according to an embodiment of the present invention.
Figure 1B:
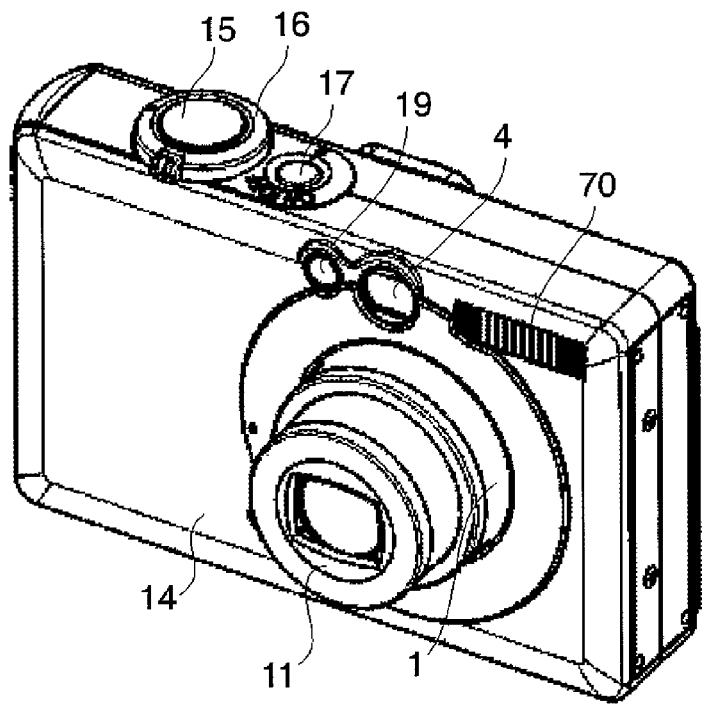
Figure 2A:
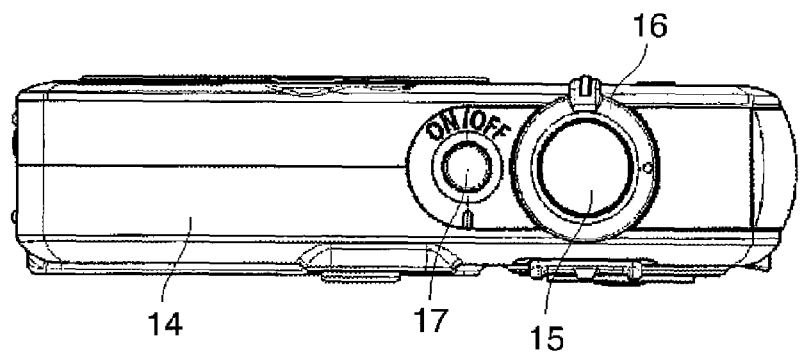
FIGS. 2A to 2C are external views of the digital camera of FIG. 1.
Figure 2B:
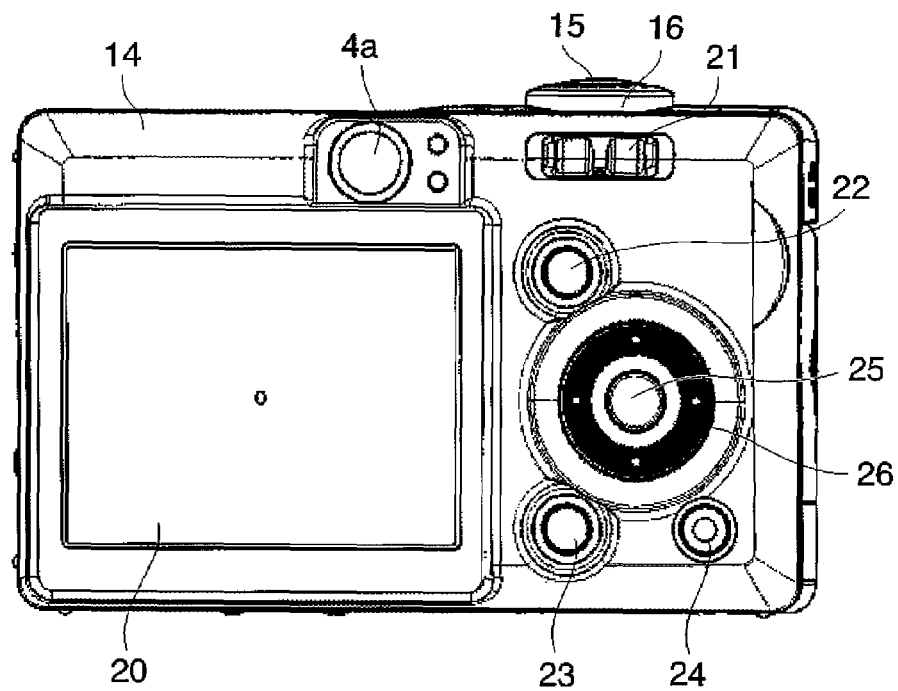
Figure 2C:
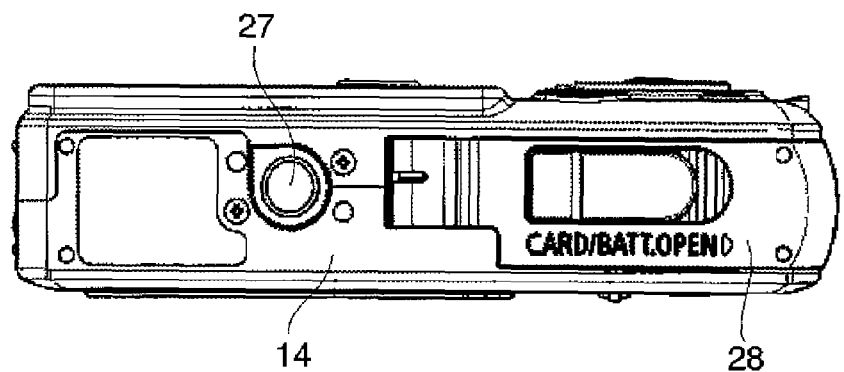

FIGS. 1A and 1B are external perspective views of a digital camera that is an imaging device including a barrel lens according to an embodiment of the present invention. FIG. 1A shows a state in which the power is switched off in the digital camera, and FIG. 1B shows a state in which the power is switched on. FIGS. 2A to 2C are external views of the digital camera of FIG. 1. FIG. 2A is a top view, FIG. 2B is a rear view, and FIG. 2C is a bottom view.

As shown in FIGS. 1A and 1B, a digital camera 14 includes a zoom mechanism to enable a degree of magnification to be altered during imaging. The digital camera 14 includes, on a front surface, a viewfinder 4 for determining a composition of a subject, an auxiliary optical unit 19 for assisting a light source when performing photometric ranging, a strobe 70, and an imaging lens barrel 11.

As shown in FIGS. 2A to 2C, a release button 15, a power switch button 17, and a zoom switch 16 are disposed on an upper surface of the digital camera 14. Moreover, a tripod attachment part 27, together with a memory card drive 42 (see FIG. 7) and battery insertion part (not shown) covered by a built-in card/battery cover 28 are disposed on a bottom surface of the digital camera 14. Operation buttons 21, 22, 23, 24, 25, and 26 are disposed on a rear surface of the digital camera 14 and allow switching of various functions. For instance, the operation buttons can be used to select an imaging mode, a playback mode, a movie imaging mode, or the like as a camera operating mode.

Further, a display 20 that is an LCD, and a viewfinder eyepiece 4a are disposed on a rear surface of the digital camera 14. The display 20 displays on a screen image data stored in a memory 40 (see FIG. 7) or image data read from a memory card. When an appropriate mode is selected, the display 20 may further show on the screen a plurality of reduced-size image data or the like.

<Construction of Lens Barrel Unit>

A description will be given of a construction of the lens barrel unit disposed in the digital camera 14 of FIG. 1, with reference to FIG. 3, FIG. 4, FIG. 5 and FIG. 6.

Figure 3:
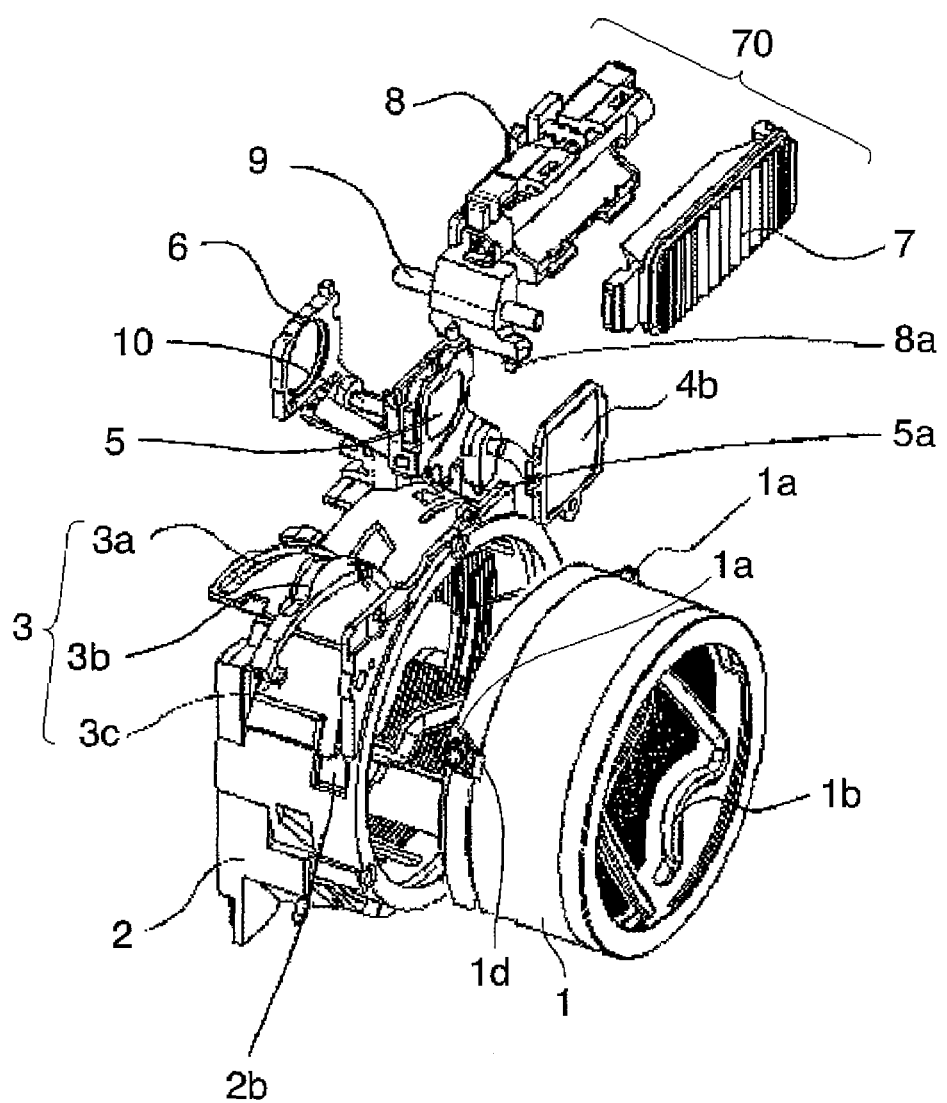
FIG. 3 is an exploded perspective view showing a construction of a barrel lens unit in the digital camera of FIG. 1.
Figure 4:
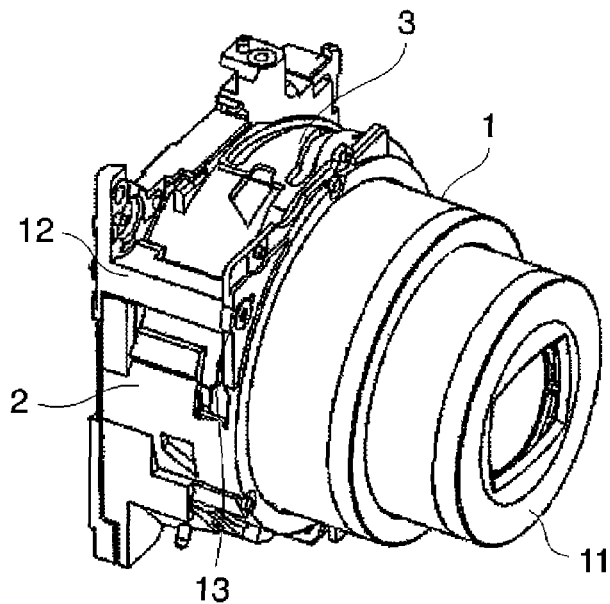
FIG. 4 is an external perspective view showing the barrel lens unit in the digital camera of FIG. 1.
Figure 5:
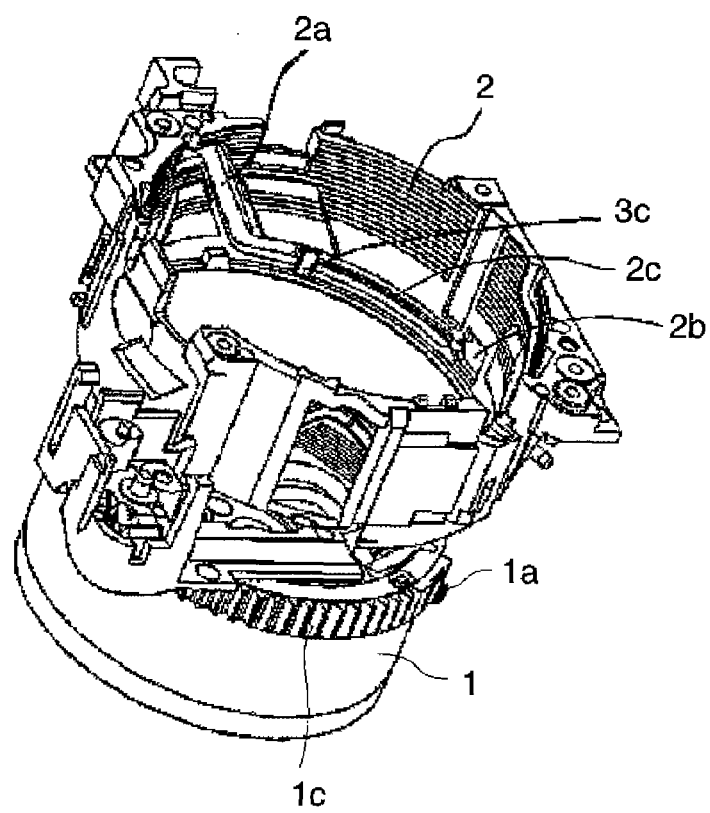
FIG. 5 is a rear perspective view of a construction of the barrel lens unit in the digital camera of FIG. 1.
Figure 6:
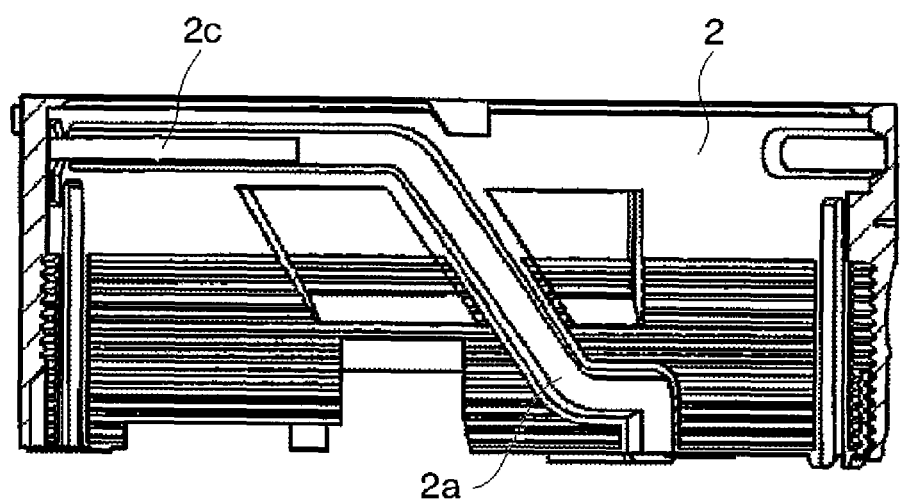
FIG. 6 is a cross-sectional view showing a construction of a fixed cylinder of the barrel lens unit in the digital camera of FIG. 1.

FIG. 3 is an exploded perspective view of the construction of the lens barrel unit in the digital camera 14 of FIG. 1, and FIG. 4 is an external perspective view of the lens barrel unit of the digital camera 14 of FIG. 1. FIG. 5 is a rear perspective view of a construction of the barrel lens unit in the digital camera 14 of FIG. 1. FIG. 6 is a cross-sectional view showing a construction of the fixed cylinder of the barrel lens unit in the digital camera 14 of FIG. 1.

Figure 7:
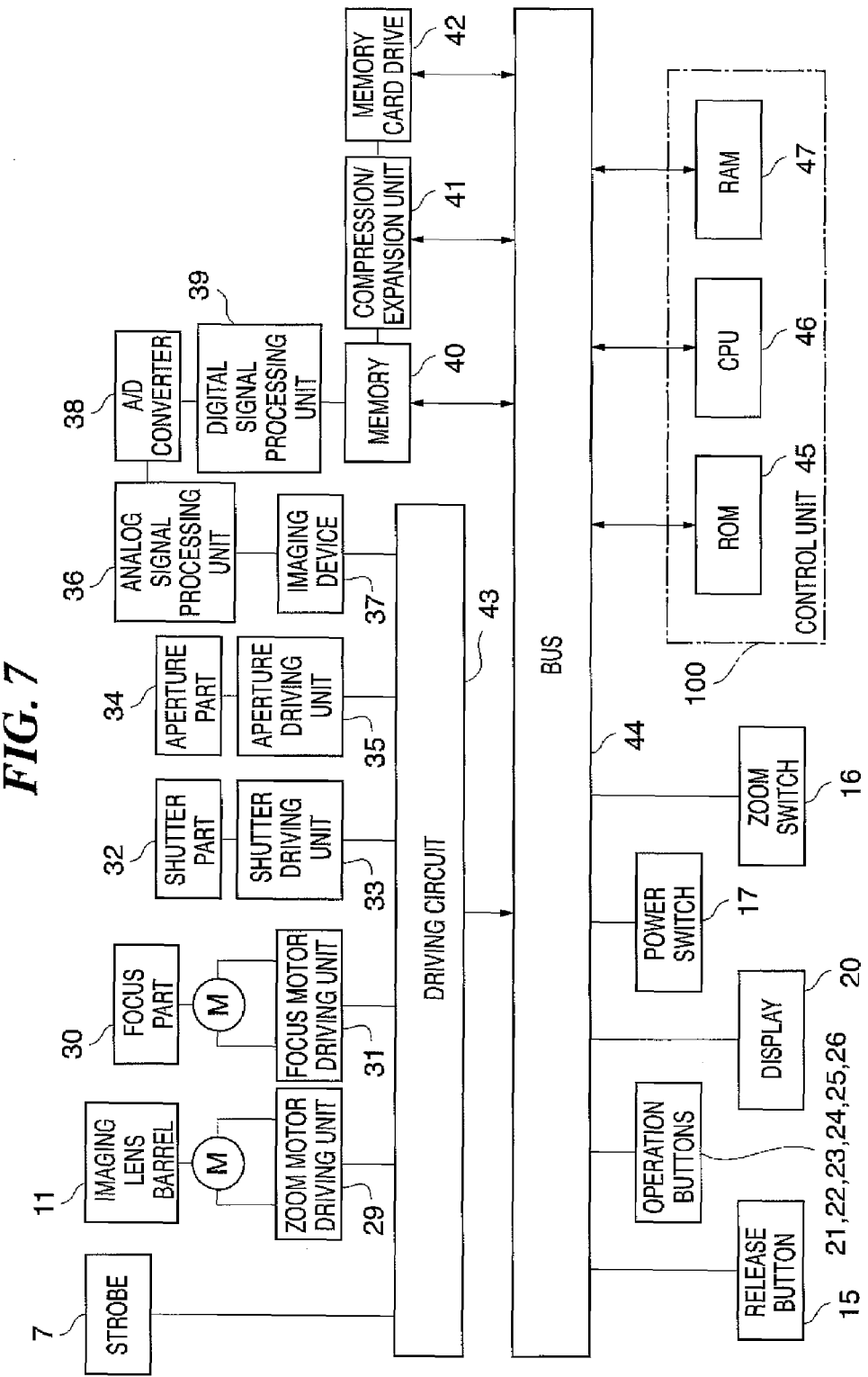
FIG. 7 is a block diagram showing an electrical construction of the digital camera of FIG. 1.

As shown in FIG. 3 and FIG. 4, the lens barrel unit according to the present embodiment includes a moving cam ring 1, and a fixed cylinder 2 disposed at an outer circumference of the moving cam ring 1. The moving cam ring 1 is driven by a gear part 1c shown in FIG. 5 in a moving cam ring driving unit (not shown), and rotates along an inner circumference of the fixed cylinder 2. The moving cam ring driving unit operates through being rotated by a zoom motor driving unit 29 (FIG. 7).

A cam-form cam grooves 2a are formed in an inner circumferential surface of the fixed cylinder 2, and the moving cam ring 1 is caused to move in the optical axis direction by follower pins 1a, disposed in the moving cam ring 1, following the cam grooves 2a. Further, cam grooves 1b are located in an inner circumferential surface of the moving cam ring 1. The imaging lens barrel 11 moves in the optical axis direction as a result of protruding parts (not shown) disposed in the imaging lens barrel 11 following the cam grooves 1b.

The cam grooves 2a are disposed at three locations separated equiangularly by 120° or the like around the circumference of the fixed cylinder 2. An upper section of each of the cam grooves 2a has a groove-form hole part (through hole) 2c formed therein, as shown in FIG. 6. The groove-form hole part 2c is formed to penetrate a portion of a bottom of the cam groove 2a.

The digital camera 14 has a built-in zoom viewfinder and a built-in zoom strobe, and the viewfinder cam plate 3 is provided so as to enable an arc-form sliding on an outer circumference of the fixed cylinder 2 for performing the respective zoom operations. The viewfinder cam plate 3 includes an integrated rib-form coupling pin 3c (protrusion). A socket part 2b is disposed in an extension of the groove-form hole part 2c of the fixed cylinder 2 as shown in FIG. 5. Fitting the coupling pin 3c into the socket part 2b that forms a portion of the groove-form hole part 2c with the phase matched, in other words, incorporating the viewfinder cam 3 into the fixed cylinder 2 in a bayonet manner enables the fixed cylinder 2 and the viewfinder cam plate 3 to be integrately held together with accuracy. There is shown in FIG. 5 a state in which the viewfinder cam plate 3 is fitted into the fixed cylinder 2. FIG. 5 shows that the coupling pin 3c is fitted into the inner surface of the fixed cylinder 2.

Operations are performed by the moving cam ring 1 interlocking with the viewfinder cam plate 3. However, the interlock is achieved by causing a direct contact between the follower pin 1a disposed on the moving cam ring 1 and the coupling pin 3c of the viewfinder cam plate 3 via the groove-form hole part 2c. Alternatively, the moving cam ring 1 may have a viewfinder cam plate driving part 1d in the vicinity of the follower pin 1a, and hence the interlock may be achieved by causing a direct contact between the viewfinder cam plate driving part 1d and the coupling pin 3c of the viewfinder cam plate 3 via the groove-form hole part (through hole) 2c.

As is clear from FIG. 5 and FIG. 6, the groove-form hole part 2c is provided up to a middle portion of the cam groove 2a, and the viewfinder cam plate 3 is adapted to be urged leftwards in FIG. 5 (rightwards in FIG. 6) in a fitted state and then stopped at an end face of the groove-form hole part 2c.

The follower pin 1a moves so as to follow the cam shape of the cam groove 2a. However, the follower pin 1a is adapted not to contact with the coupling pin 3c in a region of the imaging lens barrel 11 extending when the power is switched on in the digital camera 14. When the imaging lens barrel 11 is fully extended, and in a so-called wide-angle region, the follower pin 1a and the coupling pin 3c abut against each other. Thereafter, in a zoom region, the follower pin 1a and the coupling pin 3c move together while abutting against each other.

As described above, in an imaging region for the digital camera 14, which is to say anywhere from a wide-angle imaging position to a telephoto imaging position, the viewfinder cam plate 3 will rotate as the moving cam ring 1 rotates.

A viewfinder cam 3a and a strobe cam 3b are disposed on an upper surface of the viewfinder cam plate 3. Providing the viewfinder cam 3a and the strobe cam 3b on the viewfinder cam plate 3 in this way makes it possible to efficiently construct both the zoom viewfinder and the zoom strobe without size-increasing.

A description will be given of the zoom viewfinder and the zoom strobe according to the present embodiment below.

First, a construction of the viewfinder is described below.

As shown in FIG. 3, a viewfinder lens 4b is fixed to a front surface of the digital camera 14. Further, viewfinder lenses 5 and 6 are disposed behind the viewfinder lens 4b. The viewfinder lenses 5 and 6 are constrained to allow only forward and backward movement by a viewfinder straight motion constrainer 10, and held by a viewfinder lens holding unit, which is not shown in the drawings. The viewfinder lens 5 allows viewfinder magnification through movement in the optical axis direction in a so-called zoom viewfinder configuration. A viewfinder lens following part 5a which follows the viewfinder cam 3a is provided at a bottom part of the viewfinder lens 5 in a tightly integrated manner.

Next, a construction of the strobe is described below.

A strobe lens 7 is fixed to the front surface of the digital camera 14, and a strobe light generating unit 8 is disposed behind the strobe lens 7. the strobe light generating unit 8 having a strobe following part 8a integrated therein follows the strobe cam 3b. The strobe light generating unit 8 is constrained to forward and backward movement by a strobe straight motion constrainer 9. Altering the separation between the strobe light generating unit 8 and the strobe lens 7 to thereby alter the angle of light generation makes it possible to construct a zoom strobe capable of supporting changes in the angle of view of the imaging lens barrel 11. The strobe lens 7 and the strobe light generating unit 8 are held by a strobe holding part, which is not shown in the drawings.

Advantages of Lens Barrel Unit according to Present Embodiment (1) In the present embodiment, the follower pin 1a (follower part) of the moving cam ring 1 (first cylindrical member) and the coupling pin 3c of the viewfinder cam plate 3 (groove-form hole follower part) directly contact to each other through the groove-form hole part (through hole) 2c, thereby enabling the moving cam ring 1 and the viewfinder cam plate 3 (groove-form hole follower part) to interlock with each other. In other words, the coupling pin 3c of the viewfinder cam plate 3 penetrates through the groove-form hole part 2c (through hole) disposed in the cam groove 2a (guiding part) of the fixed cylinder 2 (second cylindrical member) and then engages with the follower pin 1a on the inner side of the fixed cylinder 2. This allows the viewfinder cam plate 3 to be constructed to move relatively to the fixed cylinder 2. With this construction, it is possible to eliminate the need for providing, in the conventional manner, a separate member on the moving cam ring to allow the moving cam ring to interlock with the viewfinder cam plate or strobe cam plate. As a result, the layout is simplified with size-reduction.

(2) When provided in conventional constructions, the through hole through which the cam plate moves had to be located in a different position to the cam groove 2a due to constructional constraints, resulting in an increased thickness of the lens barrel in the optical axis direction. In the present embodiment, on the other hand, the groove-form hole part 2c (through hole) is provided directly in the cam groove 2a, making it possible to accordingly reduce the thickness of the lens barrel.

(3) In the present embodiment, since the groove-form through hole part 2c (through hole) is formed in the cam groove 2a whose dimensions must be precisely controlled, a degree of reinforcement is required in the fixed cylinder 2 to avoid deformation in the cam groove 2a. If the fixed cylinder 2 itself cannot be sufficiently reinforced, deflection or deformation of the cam groove 2a can be prevented by joining, in the vicinity of the groove-form hole part 2c, the fixed cylinder 2 to a fixed cylinder holding part 12 for holding a rear surface of the fixed cylinder, using a joint part 13.

As described above, the lens barrel unit of the present embodiment makes it possible to realize a zoom viewfinder and a zoom strobe with a simple construction, a small device size, and an efficient interlock.

The present embodiment is realized for a digital camera was described, but the lens barrel unit construction of the present embodiment can be applied to a video camera, an analogue camera which make use of silver halide film, or any other device with a similar lens barrel structure.

<Electrical Construction and Operation of Imaging Device>

A description will be given of the electrical construction and operation of the imaging device including the lens barrel unit of the present embodiment, with reference to FIG. 7 and FIG. 8.

FIG. 7 is a block diagram of the electrical construction of the digital camera 14 of FIG. 1.

As shown in FIG. 7, a control unit 100 of the digital camera 14 is constructed of a CPU 46, a ROM 45, and a RAM 47. The control unit 100 is connected via a bus 44 to various components, including the release button 15, the operation buttons 21 to 26, the display 20, the memory 40, and the memory card drive 42.

Various functional components including the zoom motor driving unit 29, a focus motor driving unit 31, a shutter driving unit 33, an imaging device 37 such as a CCD or CMOS device, and the strobe 7 connect to a driving circuit 43, which also connects to the control unit 100 via the bus 44. The driving circuit 43 controls the driving of the functional components according to signals from the control unit 100. The ROM 45 stores programs for controlling the above-described functional components, and the RAM 47 stores data required by the control programs.

A description will be given of the overall operation of the digital camera of the present embodiment.

When the power is switch from off to on by the user via an operation on the power switch button 17, the CPU 46 reads the required control program from the ROM 45 and starts an initializing operation. In short, the imaging lens barrel 11 is moved into a predetermined region at which imaging is possible, the imaging functions are started up, and the digital camera moves into a standby state.

When the release button 15 for performing image capture is pressed, a brightness of the subject is sensed by the imaging device 37, and decisions about aperture, shutter speed, and whether the strobe 7 should generate light are made based on the measured amount of light. Note that the user may select whether or not to have the strobe 7 to produce light using a preset operation button 22.

The distance to the subject is measured, and the focus motor driving unit 31 drives a motor to move a focus part 30 to a predetermined focus position. A shutter part 32 is then open and shut to input the desired image on the imaging device 37. The imaging device 37 collects charge depending on an amount of incident light which in turn depends on an exposure control value. The charge becomes an image signal and is outputted to an analog signal processing unit 36.

The analog signal processing unit 36 implements analogue processing on the received image data, and outputs to an A/D converter 38. The A/D converter 38 converts the received analog data to digital data. The digital data is outputted to a digital signal processing unit 39 and digital data processing is performed therein. Lastly, the digital data is stored in the memory 40.

In response to an operation on the operation button 23, compression processing is implemented on the data from the memory 40 using JPEG, TIFF or the like by a compression/ expansion unit 41. The resulting data is then outputted to and stored on the memory card. In digital cameras which do no have a memory corresponding to the memory 40, the digital data processed in the digital signal processing unit 39 is outputted to the compression/expansion unit 41, and stored by the memory card drive 42.

The image data stored in the memory 40 and the image data stored by the memory card drive 42 can be expanded by the compression/expansion unit 41 and displayed by the display 20 via the bus 44. A user is able to look at the data on the display 20, and delete unnecessary image data using an operation on the operation button 24.

Operations on the zoom switch 16 to control the zoom motor driving unit 29 via the driving circuit 43, cause lenses in the imaging lens barrel 11 to move in the optical axis direction. Operations on the zoom switch 16 further enlarge and reduce the stored image displayed on the display 20, thereby enabling so-called digital zoom.

A description will be given of operations from switch-on to completion of imaging in a digital camera that is the imaging device having the lens barrel unit according to the present embodiment, with reference to FIG. 8.

Figure 8:
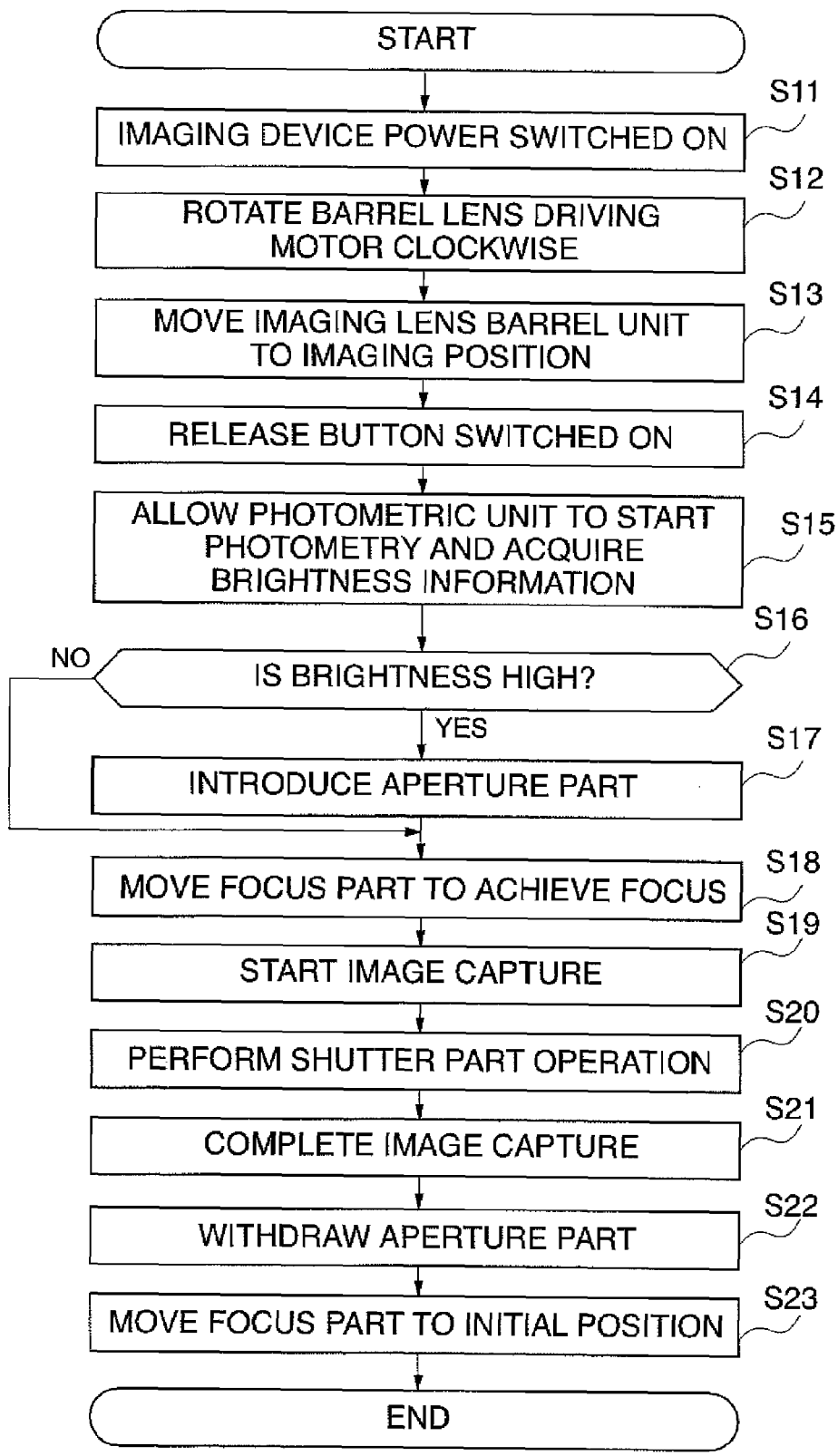
FIG. 8 is a flowchart showing operations from switch-on to completion of image capture in the digital camera of FIG. 1.

FIG. 8 is a flowchart showing operations from switch-on to completion of imaging in the digital camera of FIG. 1.

When the user switches on the power in the imaging device (step S11), the CPU 46 transmits an instruction to the zoom motor driving unit 29, causing a lens barrel driving motor to rotate clockwise (step S12). Thereafter, a predetermined operation is performed, causing the imaging lens barrel 11 to stop when it is confirmed that the imaging lens barrel 11 has moved into the imaging position (step S13). At this point, the imaging lens barrel 11 moves from a state shown in FIG. 1A to a state shown in FIG. 1B.

Next, when the user switches on the release button 15 (step S14), a photometric unit measures an amount of light and obtains brightness information about the subject (step S15). If the obtained brightness information indicates that the brightness is higher than a predetermined level (step S16), an aperture part 34 is introduced into the optical axis, causing a change in the amount of incident light (step S17). If the obtained brightness information indicates that the brightness is lower than a predetermined level, the operation using the aperture part 34 is not performed. Instead the aperture part 34 is left in withdrawn state.

Thereafter, the focus part 30 is moved to a position in which the subject is in focus (step S18), and image capture is started (step S19). Next, the shutter part 32 is moved from an open state to a closed state (step S20), an amount of light is received, and image capture is completed (step S21). Thereafter, the aperture part 34 is withdrawn from the optical axis (step S22) and the focus part 30 moved to the initial position, followed by completing the operations (step S23).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-009302 filed Jan. 18, 2007, which is hereby incorporated by reference herein in its entirety.

What is claimed is:

1. A lens barrel comprising:
   a first cylindrical member; and
   a second cylindrical member that is disposed so as to receive the first cylindrical member, and includes a guiding part at an inner circumferential surface thereof,
   wherein the guiding part includes a groove-form hole part that penetrates the second cylindrical member, and
   the first cylindrical member includes a follower part that follows the guiding part having the groove-form hole part.

2. A lens barrel as claimed in claim 1, wherein the first cylindrical member is driven by a driving unit, and the guiding part is adapted to movably guide the follower part in an optical axis direction of the lens barrel as the first cylindrical member is driven by the driving unit.

3. A lens barrel as claimed in claim 1, further comprising a groove-form hole follower part that is fitted in the groove-form hole part and follows the groove-form hole part.

4. A lens barrel as claimed in claim 3, wherein the follower part is adapted to drive the groove-form hole follower part via the groove-form hole part.

5. A lens barrel as claimed in claim 4, wherein the guiding part is adapted to include such a phase as that the groove-form hole follower part does not interlock with the follower part.

6. A lens barrel as claimed in claim 3, wherein the first cylindrical member includes a groove-form hole follower driving part that drives the groove-form hole follower part via the groove-form hole part.

7. A lens barrel as claimed in claim 6, wherein the guiding part is adapted to include such a phase as that the groove-form hole follower part does not interlock with the groove-form hole follower driving part.

8. A lens barrel as claimed in claim 1, wherein the guiding part comprises a cam groove, the groove-form hole part comprises a through hole, and the follower part comprises a follower pin.

9. A lens barrel as claimed in claim 3, wherein the groove-form hole follower part is provided with a viewfinder cam that drives a viewfinder lens.

10. A lens barrel as claimed in claim 3, wherein the groove-form hole follower part is provided with a strobe cam that drives at least one of a strobe lens and a strobe light generating unit.

11. A lens barrel as claimed in claim 3, wherein the groove-form hole follower part is provided with a viewfinder cam that drives a viewfinder lens and a strobe cam that drives at least one of a strobe lens and a strobe light generating unit.

12. A lens barrel as claimed in claim 1, further comprising a cylindrical member holding part that holds the second cylindrical member, wherein the second cylindrical member is joined to the cylindrical member holding part at a position where the groove-form hole part is formed.

13. A lens barrel as claimed in claim 3, wherein the groove-form hole follower part includes a rib-form protrusion, the second cylindrical member includes a socket part to accept the rib-form protrusion, and the groove-form hole follower part and the second cylindrical member are integrated by the protrusion passing through the socket part.

14. An imaging device including the lens barrel as claimed in claim 1.

* * * * *